(12) United States Patent
Renke et al.

(10) Patent No.: US 8,833,830 B2
(45) Date of Patent: Sep. 16, 2014

(54) VEHICULAR ACCESSORY RETENTION CLIP, ASSEMBLY, AND METHOD THEREOF

(71) Applicant: GM Global Technology Operations LLC, Detroit, MI (US)

(72) Inventors: David T. Renke, Macomb, MI (US); Paul W. Renius, Metamora, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/630,030

(22) Filed: Sep. 28, 2012

(65) Prior Publication Data

US 2014/0091588 A1   Apr. 3, 2014

(51) Int. Cl.
*B60R 13/02*   (2006.01)

(52) U.S. Cl.
USPC ...... 296/1.08; 296/146.7; 296/214; 296/39.1; 24/295; 24/458; 24/595.1

(58) Field of Classification Search
CPC .............. F16B 2/04; F16B 2/06; F16B 7/044
USPC ............. 24/458, 581.1, 595.1, 293–295, 297; 296/146.7, 214, 39.1, 1.08
See application file for complete search history.

(56) References Cited

U.S. PATENT DOCUMENTS

| 942,693 | A | * | 12/1909 | Wintermute | 403/276 |
|---|---|---|---|---|---|
| 2,216,219 | A | * | 10/1940 | Wiley | 24/293 |
| 4,043,579 | A | * | 8/1977 | Meyer | 293/143 |
| 4,892,434 | A | * | 1/1990 | Miller | 403/361 |
| 6,019,411 | A | * | 2/2000 | Carter et al. | 296/37.7 |
| 6,101,686 | A | * | 8/2000 | Velthoven et al. | 24/295 |
| 7,475,934 | B2 | * | 1/2009 | Sato et al. | 296/146.7 |
| 8,177,195 | B2 | * | 5/2012 | Schall et al. | 256/22 |

* cited by examiner

*Primary Examiner* — Dennis H Pedder
(74) *Attorney, Agent, or Firm* — Quinn Law Group, PLLC

(57) ABSTRACT

A vehicular accessory retention clip is used to attach a vehicular accessory, such as vehicular trim, to a vehicle. The vehicular accessory may have a substrate component that has at least one reinforcement post, and the vehicle may have a vehicular base component that has at least one corresponding opening configured to receive the reinforcement post. The retention clip has at least two walls that extend from an edge of a platform, each wall having an exterior tab and an interior tab configured to engage with the walls of the opening and the reinforcement post, respectively. The retention clip is slid onto the reinforcement post until the interior tabs engage with the reinforcement post, and the combination of the retention clip and reinforcement post is inserted until the exterior tabs engage with the walls of the opening.

16 Claims, 4 Drawing Sheets

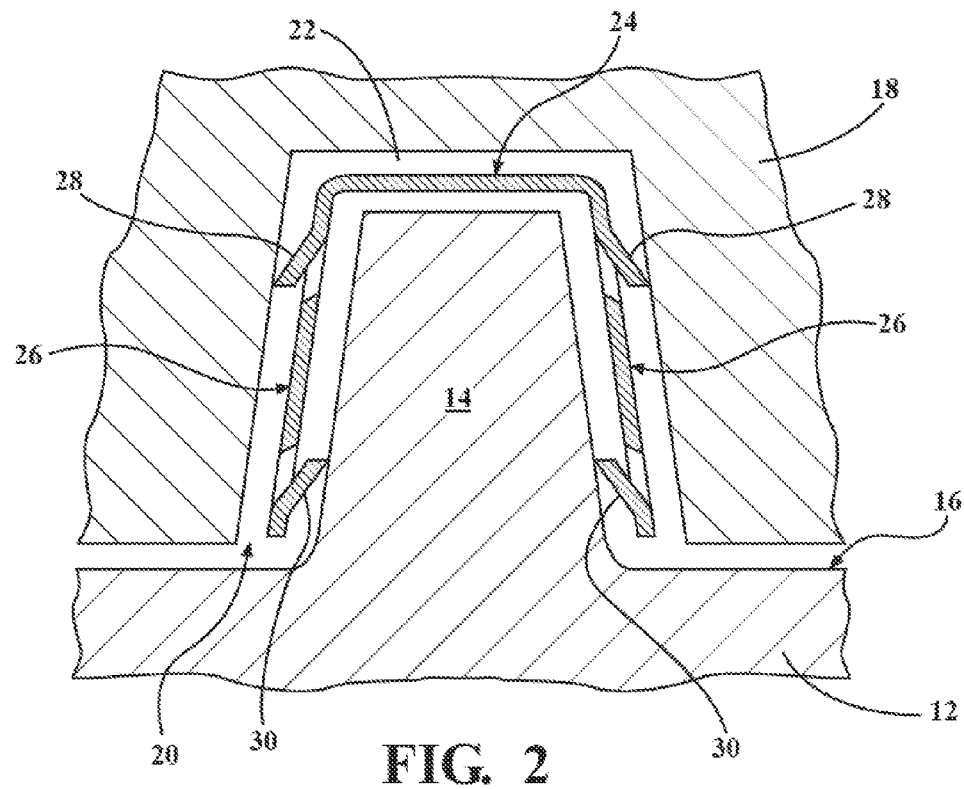
FIG. 2
FIG. 3
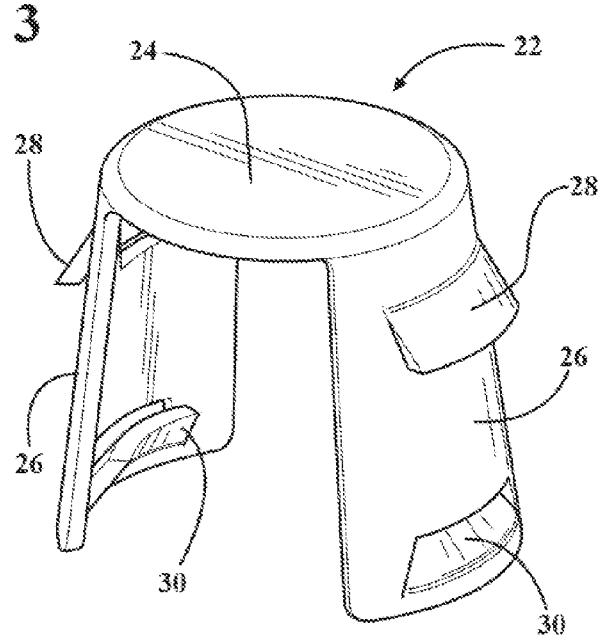

VEHICULAR ACCESSORY RETENTION CLIP, ASSEMBLY, AND METHOD THEREOF

TECHNICAL FIELD

The present invention relates to a retention clip for attaching to a vehicle a vehicular accessory, such as a vehicular trim, a vehicular accessory assembly, and a method thereof.

BACKGROUND

There are various types of trim, molding, and other vehicular accessories that may serve decorative and/or protective purposes. These may include, but are not limited to, side body moldings, lower body moldings, door moldings, window moldings, footrest moldings, grilles, and the like. The assembly of these parts often involves multiple components, including, but not limited to, a base component of the vehicle, and a substrate of the vehicular accessory. For example, a window molding may include the assembly of a frame of the window, a sheet of glass, a substrate that attaches to the frame, thereby encasing the glass window, and ultimately the molding, which attaches to the substrate via adhesives and some form of pressure-sensitive (PSA) tape. The substrate is typically attached to the base component also via adhesives and PSA tape and/or holding fixtures. In addition, the base component may have openings, and the substrate may have corresponding posts that fit into those openings, to help properly position the components during assembly. The openings and posts generally do not serve any other function.

SUMMARY

A retention clip for attaching a vehicular accessory to a vehicle is provided. The retention clip has a platform and at least two walls that extend from an edge of the platform. Each wall has an exterior surface and an interior surface. Each wall further has at least one exterior tab that protrudes from the exterior surface and at least one interior tab that protrudes from the interior surface. The exterior tabs and interior tabs are configured to engage with a base component of the vehicle, and with components of the vehicular accessory, such as a substrate, respectively.

A vehicular accessory assembly is also provided. The vehicular accessory assembly includes a substrate and a vehicular base component. The substrate has a surface and at least one reinforcement post extending from the surface. The vehicular base component has at least one opening configured to receive the at least one reinforcement post. The substrate and the base component are attached via at least one retention clip, as described above. The retention clip is configured to fit over the reinforcement post such that the interior tabs may engage with the reinforcement post. The retention clip is further configured to fit inside the opening such that the exterior tabs may engage with the walls of the opening. This will create a compressive fit between the components, thereby promoting the attachment of the substrate to the vehicular base component via the retention ring.

A method for assembling a vehicular accessory assembly is also provided. The method includes first forming a retention clip, as described above, where the retention clip is configured to attach the vehicular accessory to a vehicle. The forming of the retention clip may be accomplished through a molding process. Alternatively, the forming of the retention clip may be accomplished by first cutting a panel in the shape of the retention clip, then cutting at least four tabs and bending them away from the panel to form the exterior tabs and the interior tabs, and finally bending the sides of the panel to form the platform and the two side walls. The cutting and bending of the tabs are such that each side wall will have at least one exterior tab and one interior tab.

The method further includes sliding the retention clip over a reinforcement post of a substrate component of the vehicular accessory until the interior tabs engage with the reinforcement post, creating a compressive fit. The method further includes inserting the combination of the retention clip and reinforcement post into an opening in a vehicular base component until the exterior tabs engage with the walls of the opening, creating a compressive fit. This will allow the vehicular accessory to be attached to the vehicle.

The above features and advantages, and other features and advantages, of the present invention are readily apparent from the following detailed description of some of the best modes and other embodiments for carrying out the invention, which is defined solely by the appended claims, when taken in connection with the accompanying drawings.

BRIEF DESCRIPTION OF THE DRAWINGS

FIG. 2 is a schematic, fragmentary cross-sectional view of the vehicular trim assembly of FIG. 1, showing the substrate and the vehicular base component attached via the retention clip;

FIG. 3 is a schematic, perspective view of the retention clip of FIGS. 1 and 2;

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Figure 1:
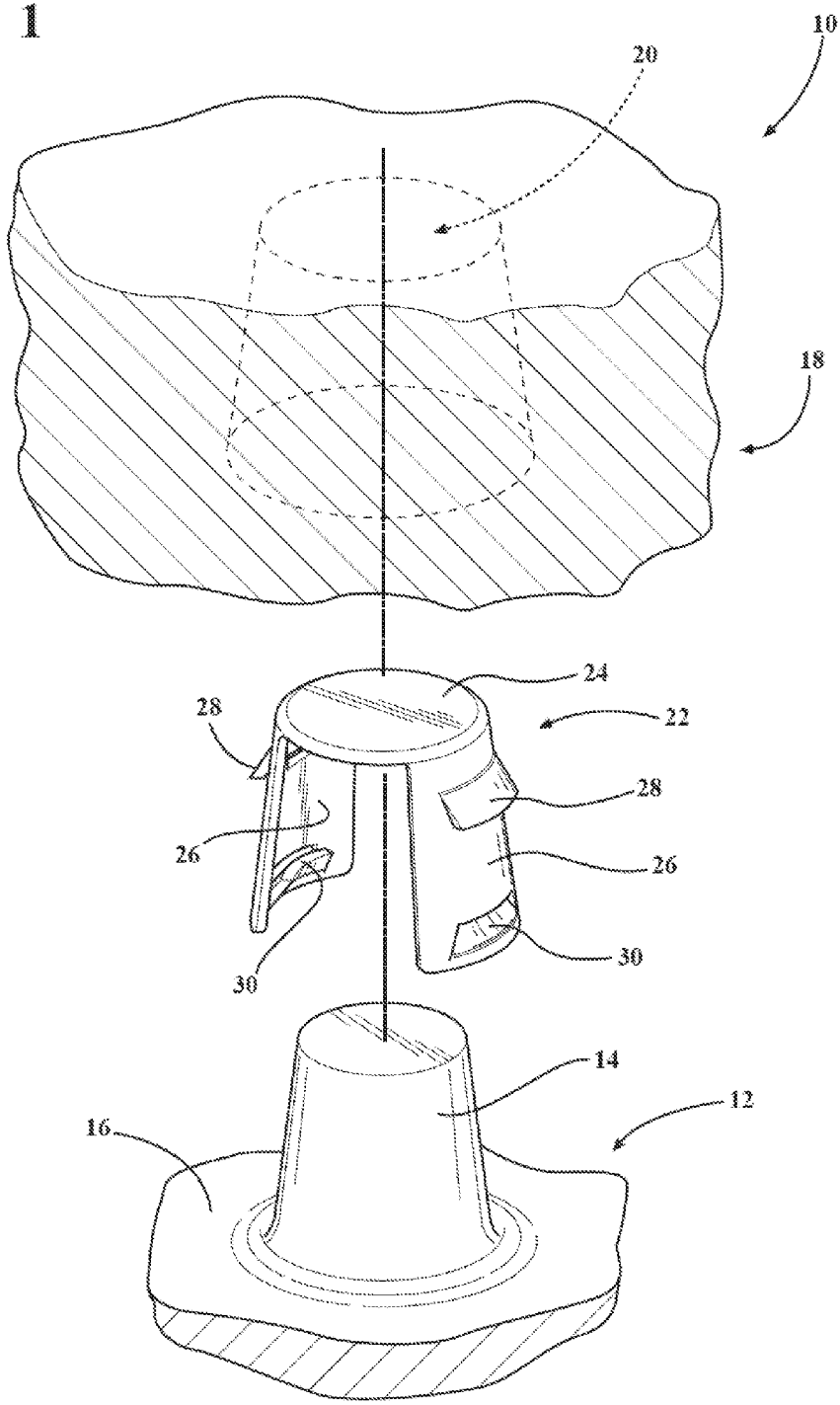
FIG. 1 is a schematic, exploded fragmentary perspective view of a vehicular trim assembly, including a substrate, a retention clip, and a vehicular base component.

Referring to the drawings, wherein like reference numbers correspond to like or similar components wherever possible throughout the several figures, there is shown in FIG. 1 a vehicular trim assembly 10 in an exploded, fragmentary view in which the components are unassembled. The vehicular trim assembly 10 generally comprises a substrate 12, a vehicular base component 18, and a retention clip 22. The overall shape, size, and configuration of both the substrate 12 and the vehicular base component 18 are not critical to the invention, and as such, only their relevant portions are shown. While the vehicular trim is attached to the substrate 12 via adhesives and/or PSA tape, the vehicular trim is not relevant to the present invention, and as such, is not shown in the figures or discussed in detail herein.

In addition, while the present invention may be described with respect to a vehicular trim assembly 10, it should be appreciated that the invention may be applied to other vehicular accessories, including, but not limited to, grilles. In such embodiments, the vehicular accessory may or may not have a substrate to which it attaches, and as such, the substrate 12 may represent the vehicular accessory itself.

Furthermore, as the substrate 12 and the vehicular base component 18 are existing components in the industry, the materials of both are not pertinent to the invention, and therefore, are not described in detail herein.

Referring to FIG. 2, a cross-sectional view taken through the center of the vehicular trim assembly 10 is shown. Again, only the relevant portions of the substrate 12 and the vehicular base component 18 are shown. The substrate 12 includes a reinforcement post 14 and a surface 16, and the vehicular base component 18 has an opening 20 in a location corresponding to the reinforcement post 14. Generally, the reinforcement post 14 is inserted into the corresponding opening 20 in order to properly align the substrate 12 with the vehicular base component 18 so ultimately, the vehicular trim may be properly installed.

Figure 4:
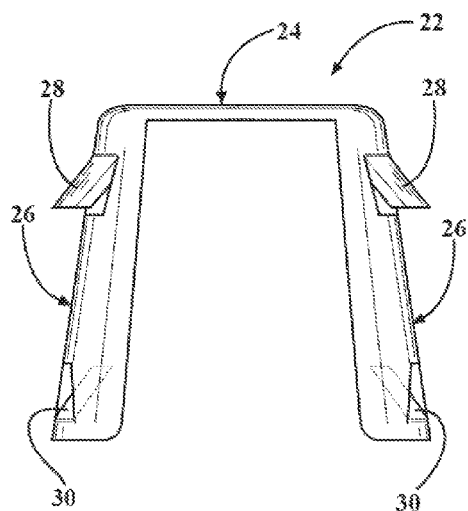
FIG. 4 is a schematic, front view of the retention clip of FIG. 3.

In the present invention, the retention clip 22 is added to the combination of the reinforcement post 14 and opening 20 in order to provide the additional functionality of attaching the substrate 12 to the vehicular base component 18. This will reduce, or even eliminate, the need for adhesives, PSA tape, and/or holding fixtures, thereby simplifying the assembly and installation of vehicular trim and/or other vehicular accessories. The retention clip 22 slides over the reinforcement post 14 until it engages with the reinforcement post 14. The combination of the reinforcement post 14 with the retention clip 22 then is inserted into the opening 20 until the retention clip 22 engages with the walls of the opening 20. The retention clip 22 is depicted in FIGS. 3 and 4 and is described in more detail hereinafter. Alternatively, the retention clip 22 may first be inserted into the opening 20 until it engages with the walls of the opening 20. Then, the reinforcement post 14 may be inserted into the combination of the retention clip 22 and the opening 20 until the retention clip 22 engages with the reinforcement post 14.

The reinforcement post 14 may be shaped generally like a cylinder with tapered walls, or a conical frustum. The tapered walls allow the retention clip 22 to engage with the reinforcement post 14 at a specific height along the reinforcement post 14 where its diameter at that height is equal to the distance between interior tabs 30 of the retention clip 22, described hereinafter. In another embodiment, the reinforcement post 14 may be a cylinder without tapered walls. The walls of the opening 20 also may be tapered to similarly allow the retention clip 22 to engage with the opening 20 at a specific height where the diameter of the walls of opening 20 at that height is equal to the distance between exterior tabs 28 of the retention clip, described hereinafter. This will allow the positioning and spacing between the vehicular base component 18 and the substrate 12 to be set.

The dimensions, particularly the height and diameters, of the reinforcement post 14 and the opening 20 may be any size that is feasible for the vehicular trim assembly 10, as controlled by parameters, such as the thickness of the vehicular base component 18. Generally, the dimensions of the reinforcement post 14 and the opening 20 should be such that the opening 20 may receive the reinforcement post 14.

The substrate 12 may further comprise a height adjustment component (not shown) that may allow the spacing between the substrate 12 and the vehicular base component 18 to be adjusted. The height adjustment component may be any protrusion from the surface 16 that rests between the substrate 12 and the vehicular base component 18. The height adjustment component may be moved up or down by any means known to a person of ordinary skill in the art. For example, in one embodiment, the height adjustment component may comprise a nut on a threaded shaft.

Referring to FIG. 3, a schematic, perspective view of the retention clip 22 is shown. The retention clip 22 has a platform 24 and two walls 26 that extend from an edge of the platform 24, each wall 26 having an exterior surface and an interior surface.

The platform 24 may be any regular or irregular shape, including, but not limited to, a circle.

While FIG. 3 depicts two walls 26 only, the retention clip 22 may have as many walls 26 as is feasible within embodiments of the present invention. For example, in another embodiment, there may be three walls 26 spaced at equal intervals. In another embodiment, there may be one wall that spans a majority of the circumference or perimeter of the platform 24.

The retention clip 22 further has two exterior tabs 28 and two interior tabs 30 that protrude from the exterior surface and interior surface, respectively, of the walls 26. Each wall 26 may have one exterior tab 28 and one interior tab 30. Where the retention clip 22 has multiple walls 26, there may be additional exterior tabs 28 and interior tabs 30 so that each wall 26 has at least one exterior tab 28 and at least one interior tab 30. Where the retention clip 22 has just one wall 26, there should be at least two exterior tabs 28 and two interior tabs 30 to provide sufficient contact with the walls of the opening 20 and the reinforcement post 14, respectively.

The tabs 28 and 30 may be cut from and bent out of the respective walls 26, as depicted in FIG. 3 and described in method 200 hereinafter, such that the tabs 28 and 30 each have a proximate end attached to the respective wall 26, and a distal end. Alternatively, the tabs 28 and 30 may be attached to the walls 26 by any means known to a person of ordinary skill in the art, such as welding. Alternatively, the tabs 28 and 30 may be formed through a molding process.

The exterior tabs 28 and the interior tabs 30 may have the same or different dimensions. The width of the tabs 28 and 30 may span the entire width of the wall 26 from which they extend. However, where the tabs 28 and 30 are cut from and bent out of the walls 26, the width of the tabs 28 and 30 would have to be less than that of the wall 26. Generally, the tabs 28 and 30 should be as wide as possible to increase the contact area between the tabs 28 and 30 and the walls of the opening 20 and the reinforcement post 14, respectively.

The length of the tabs 28 and 30 is critical only in establishing the distance between the distal end of the tabs 28 and 30 and the wall 26, and the angle formed between the tabs 28 and 30 and the wall 26. The angle should generally be acute to minimize the moment on the proximate end when the tabs 28 and 30 are engaged with the walls of the opening 20 and the reinforcement post 14, respectively. The distance between the distal end of the tabs 28 and 30 will determine at what location the tabs 28 and 30 will come into contact with the walls of the opening 20 and the reinforcement post 14, respectively.

In another embodiment not shown in the figures, the tabs 28 and 30 instead may be protrusions on the exterior surface of the wall 26 and the interior surface of the wall 26, respectively. In such an embodiment, the protrusions should still provide a maximum contact area between the protrusions and the respective surface with which the protrusions will engage. Also, the height of each protrusion from the respective wall 26 will be determined by the desired positioning of the retention clip 22 in relation to the substrate 12 and the vehicular base component 18.

In yet another embodiment not shown in the figures, the retention clip 22 may further have a bump or protrusion on the platform 24. The bump or protrusion may serve to control the spacing between the substrate 12 and the vehicular base component 18, similar to the height adjustment component described above.

The retention clip 22, including the tabs 28 and 30, is generally made of a rigid or semi-rigid material, including, but not limited to, spring steel, PVC, and the like. This is so the tabs 28 and 30 will undergo no more than an insignificant amount of deformation when they engage with the walls of the opening 20 and the reinforcement post 14, respectively, thereby creating a compressive fit such that the substrate 12 and the vehicular base component 18 may be attached to each other without the need of adhesives, PSA tape, and/or holding fixtures.

Figure 6:
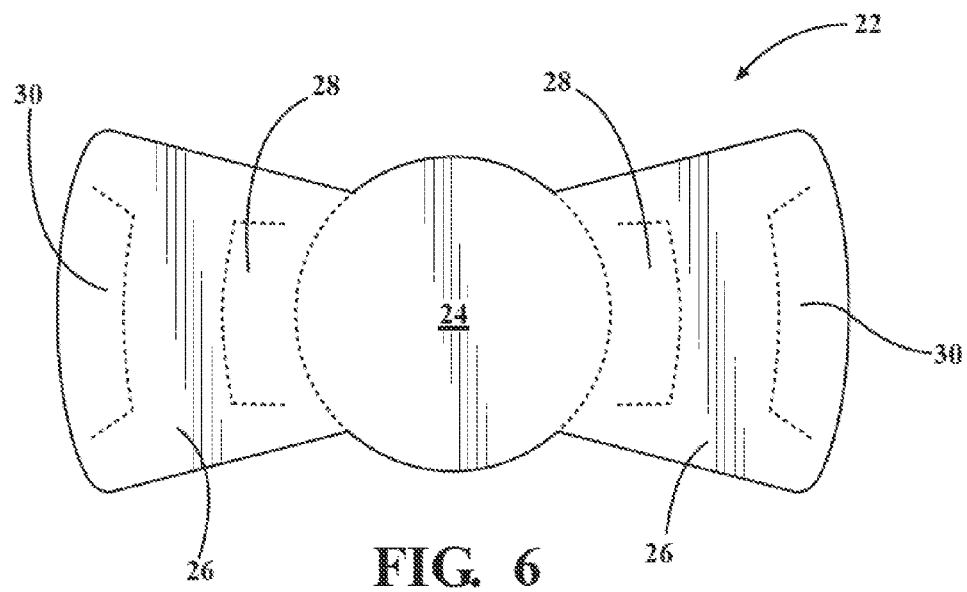
FIG. 6 is a schematic, plan view of the reinforcement component of FIG. 5 in an unformed state.
Figure 7:
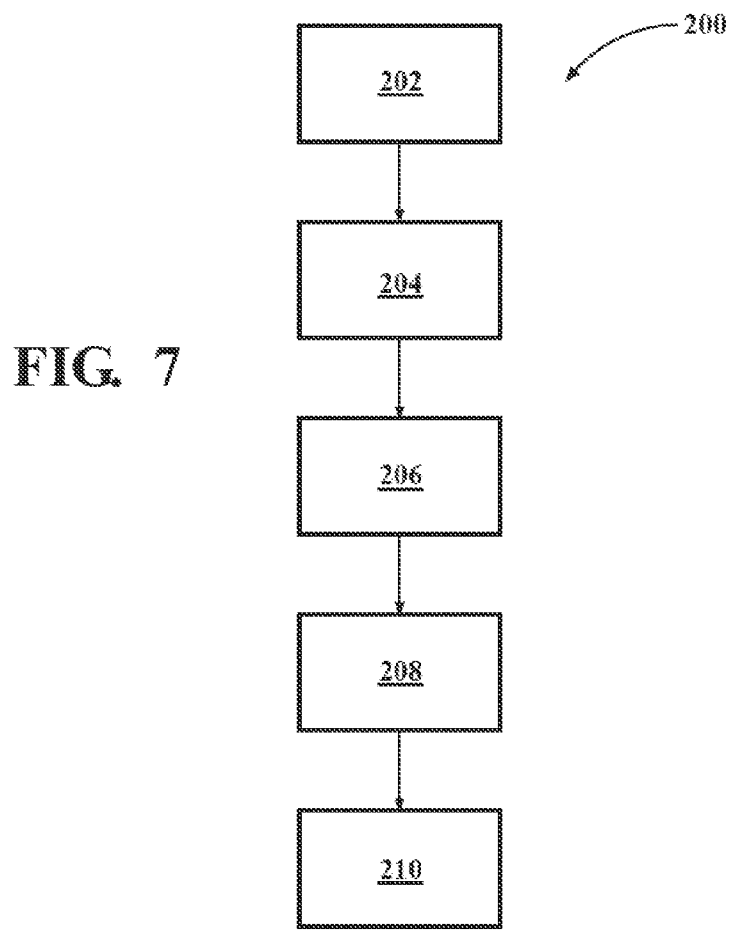
FIG. 7 is a schematic flow diagram illustrating a method of manufacturing the retention clip of FIGS. 3 and 4, and assembling the vehicular trim assembly of FIGS. 1 and 2.

Referring to FIG. 6, the retention clip 22 is shown in an unformed state. As depicted in FIG. 7 and described in method 200 hereinafter, the retention clip 22 may be cut from a sheet of material. The resulting piece may then be bent to form the final configuration of the reinforcement component 14. The locations at which the cut piece should be bent are indicated by dashed lines in FIG. 6. Alternatively, the retention clip 22 may be molded.

Referring to FIG. 7, a method 200 of manufacturing the retention clip 22 and assembling the vehicular trim assembly 10 is shown as a flow diagram. Again, while method 200 is applied to a vehicular trim assembly, it should be appreciated that method 200 may be applied to other vehicular accessories.

Method 200 begins with step 202, in which the retention clip 22 is formed. This may be accomplished through a molding process. Alternatively, this may be accomplished through several sub-steps that first include cutting a panel from a sheet of material, the panel being in the shape of the retention clip 22 in its unformed state as depicted in FIG. 6. As explained above, the material is generally rigid, or semi-rigid, such that it will not deform. The material may include, but is not limited to, spring steel, PVC, and the like.

The forming of the retention clip 22 may then include cutting tabs from the panel, and bending the tabs away from the panel to form the exterior tabs 28 and the interior tabs 30.

The forming of the retention clip 22 may finally include bending ends of the panel to form distinct walls 26 that extend from a platform 24.

In alternative embodiments, where the tabs 28 and 30 are attached to the walls 26, or where there are protrusions in lieu of the tabs 28 and 30, the forming of the retention clip 22 may further include attaching the tabs or protrusions to the walls 26. This may be performed either before or after the bending of the panel to form the walls 26.

After step 202, method 200 proceeds to step 204 in which the substrate 12 is provided. As described above, the substrate 12 has at least one reinforcement post 14.

After step 204, method 200 proceeds to step 206 in which the vehicular base component 18 is provided. As described above, the vehicular base component 18 has at least one opening 20 formed by at least one wall. The at least one opening 20 is configured to receive the at least one reinforcement post 14.

After step 206, method 200 proceeds to step 208 in which the retention clip 22 is slid over the reinforcement post 14 of the substrate 12 until the interior tabs 30 engage with the reinforcement post 14, thereby creating a compressive fit. Alternatively, the retention clip 22 may be inserted into the opening 20 of the vehicular base component 18 until the exterior tabs 28 engage with the walls of the opening 20, thereby creating a compressive fit.

After step 208, method 200 proceeds to step 210 in which the combination of the retention clip 22 and the reinforcement post 14 is inserted into the corresponding opening 20 until the exterior tabs 28 engage with the walls of the opening 20. Alternatively, where the retention clip 22 is first inserted into the opening 20 in step 208, step 210 would involve inserting the reinforcement post 14 into the corresponding combination of the retention clip 22 and the opening 20 until the interior tabs 30 of the retention clip 22 engage with the reinforcement post 14.

Figure 5:
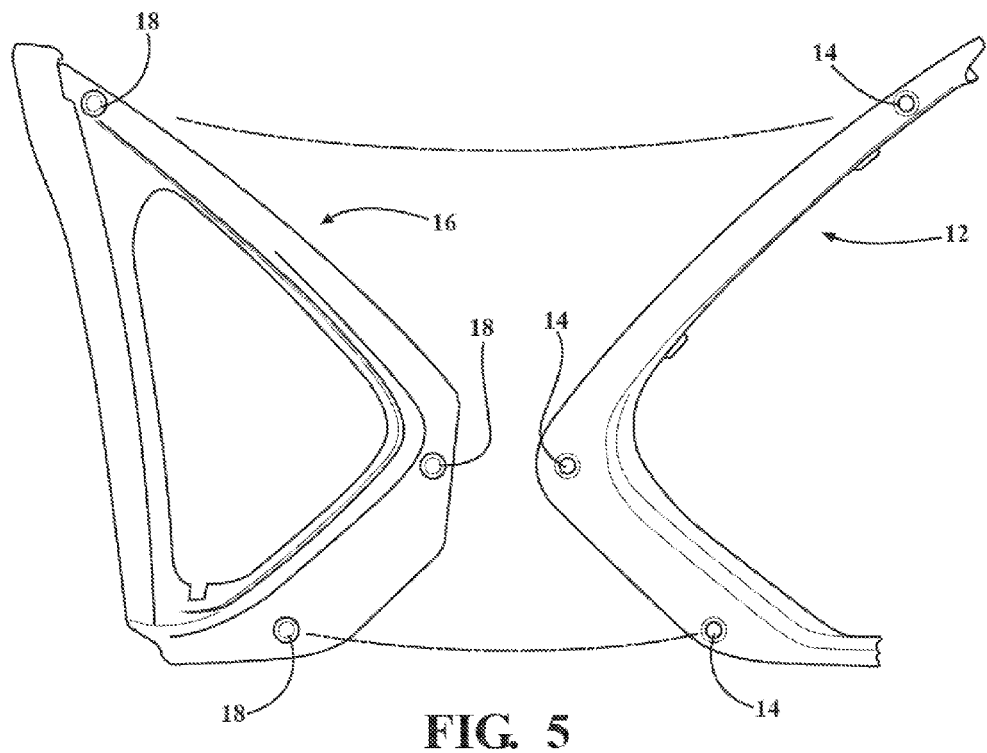
FIG. 5 is a schematic, front view of the substrate and vehicular base component of FIGS. 1 and 2.

The substrate 12 and the vehicular base component 18 may have multiple reinforcement posts 14 and corresponding openings 20, respectively. The number of retention clips 22 should generally be the same as the number of reinforcement posts 14 and openings 20. As such, method 200 may be repeated as many times as there are reinforcement posts 14 and openings 20. For example, referring to FIG. 5, the substrate 12 and the vehicular base component 18 have three corresponding reinforcement posts 14 and openings 20, respectively. Therefore, in this embodiment, method 200 would be repeated three times. While FIG. 5 depicts only three reinforcement posts 14 and openings 20, it should be appreciated that any number of reinforcement posts 14 and openings 20 may be on the substrate 12 and the vehicular base component 18, respectively.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicular accessory assembly comprising:
   a substrate having at least one reinforcement post extending from a surface of the substrate, the at one least reinforcement post having a first post end and a second post end opposite the first post end, the first post end being coupled to the surface, and the at least one reinforcement post defining a width and being tapered such that the width of the at least one reinforcement post varies from the first post end to the second post end;
   a vehicular base component having at least one opening formed by at least one wall, the at least one opening being configured to receive the at least one reinforcement post; and
   at least one retention clip having:
      a platform;
      at least two side walls extending from an edge of the platform, each side wall having an interior surface and an exterior surface;
      at least two exterior tabs each protruding from the exterior surface of one of the at least two side walls; and
      at least two interior tabs each protruding from the interior surface of one of the at least two side walls;
   wherein the at least one reinforcement post and the at least one opening are located on the substrate and the vehicular base component, respectively, such that the substrate and the vehicular base component are aligned when the at least one opening receives the reinforcement post; and
   wherein the at least one retention clip is configured to fit over the at least one reinforcement post such that the at least two interior tabs engage with the at least one reinforcement post, and to fit inside the at least one opening such that the at least two exterior tabs engage with the at least one wall of the at least one opening;

wherein the at least one retention clip has a first clip end and a second clip end opposite the first clip end, the platform being disposed at the second clip end, the at least two side walls being obliquely angled relative to each other such that the at least one retention clip is tapered, the at least one retention clip being tapered such that a width of the at least one retention clip varies from the first clip end to the second clip end; and wherein the at least one reinforcement post is tapered such the at least one retention clip engages the at least one reinforcement post at a location between the first and second post ends of the at one least reinforcement post where the width of the at least one reinforcement post is equal to a distance between the at least two interior tabs.

2. The assembly of claim 1 wherein the at least two exterior tabs each comprise:
a proximate end attached to one of the at least two side walls; and
a distal end;
wherein each exterior tab forms an angle with the side wall to which the proximate end is attached.

3. The assembly of claim 1 wherein the at least two interior tabs each comprise:
a proximate end attached to one of the at least two side walls; and
a distal end;
wherein each interior tab forms an angle with the side wall to which the proximate end is attached.

4. The assembly of claim 1 wherein the retention clip is made of spring steel.

5. A retention clip for attaching a vehicular accessory to a vehicle, the retention clip comprising:
a platform;
at least two side walls extending from an edge of the platform, each of the at least two side walls having an exterior surface and an interior surface, each of the at least two side walls having a first lateral edge and a second lateral edge, each of the first and second lateral edges extending from the exterior surface to the interior surface of each of the at least two side walls, each of the at least two side walls having a curved shape that extends from the first lateral edge to the second lateral edge, wherein the at least two side walls are obliquely angled relative to each other such that the retention clip has a tapered shape;
at least two exterior tabs each protruding from the exterior surface of one of the at least two side walls, each exterior tab being configured to engage with a component of the vehicle; and
at least two interior tabs each protruding from the interior surface of one of the at least two side walls, each interior tab being configured to engage with a component of the vehicular accessory.

6. The retention clip of claim 5 wherein the at least two exterior tabs each comprise:
a proximate end attached to one of the at least two side walls; and
a distal end;
wherein each exterior tab forms an angle with the side wall to which the proximate end is attached.

7. The retention clip of claim 5 wherein the at least two interior tabs each comprise:
a proximate end attached to one of the at least two side walls; and
a distal end;
wherein each interior tab forms an angle with the side wall to which the proximate end is attached.

8. The retention clip of claim 5 wherein the retention clip is made of spring steel.

9. A method for assembling a vehicular accessory assembly, the method comprising:
forming at least one retention clip having:
a platform;
at least two side walls extending from an edge of the platform, each side wall having an exterior surface and an interior surface;
at least two exterior tabs each protruding from the exterior surface of one of the at least two side walls; and
at least two interior tabs each protruding from the interior surface of one of the at least two side walls;
wherein the at least one retention clip has a first clip end and a second clip end opposite the first clip end, the platform being disposed at the second clip end, the at least two side walls being obliquely angled relative to each other such that the at least one retention clip is tapered, the at least one retention clip being tapered such that a width of the at least one retention clip varies from the first clip end to the second clip end;
providing a substrate having at least one reinforcement post, the at least one reinforcement post having a first post end and a second post end opposite the first post end, the first post end being coupled to the surface, and the at least one reinforcement post defining a width and being tapered such that the width varies from the first post end to the second post end;
providing a vehicular base component having at least one opening formed by at least one wall, the at least one opening being configured to receive the at least one reinforcement post;
sliding the at least one retention clip over the at least one reinforcement post until the at least two interior tabs engage with the at least one reinforcement post to form a first combination, wherein the at least one reinforcement post is tapered such the at least one retention clip engages the at least one reinforcement post only at a location between the first and second post ends of the at least one reinforcement post where the width of the at least one reinforcement post is equal to a distance between the at least two interior tabs; and
inserting the first combination into the at least one opening until the at least two exterior tabs engage with the at least one wall of the at least one opening.

10. The method of claim 9 wherein the forming of the retention clip further comprises cutting a panel from a sheet of material.

11. The method of claim 10 wherein the material is spring steel.

12. The method of claim 10 further comprising cutting the at least two exterior tabs and the at least two interior tabs from the panel.

13. The method of claim 12 further comprising bending the at least two exterior tabs and the at least two interior tabs.

14. The method of claim 13 further comprising bending ends of the panel to form the platform and the at least two side walls, wherein each side wall has at least one exterior tab and at least one interior tab.

15. The assembly of claim 1, wherein the at least one opening has a first opening end and a second opening end opposite the first opening end, the at least one wall is tapered such that a width of the at least one opening varies from the first opening end to the second opening end, the at least one wall is tapered such that the at least one retention clip engages the at least one wall at a location between the first and second opening ends where the width of the at least one opening is equal to a distance between the at least two exterior tabs.

16. The assembly of claim 2, wherein the distal end of each of the at least two exterior tabs contacts the at least one wall of the at least one opening.

* * * * *